(12) United States Patent
Wong

(10) Patent No.: US 11,182,492 B2
(45) Date of Patent: Nov. 23, 2021

(54) SECURE PORTABLE DATA APPARATUS

(71) Applicant: QDroid Inc., Seattle, WA (US)

(72) Inventor: Ivy Wong, Sammish, WA (US)

( * ) Notice: Subject to any disclaimer, the term of this patent is extended or adjusted under 35 U.S.C. 154(b) by 580 days.

(21) Appl. No.: 16/149,116

(22) Filed: Oct. 1, 2018

(65) Prior Publication Data

US 2020/0104514 A1   Apr. 2, 2020

(51) Int. Cl.
*G06F 21/60* (2013.01)
*G06F 3/06* (2006.01)
*G06F 21/62* (2013.01)

(52) U.S. Cl.
CPC .......... *G06F 21/604* (2013.01); *G06F 3/0623* (2013.01); *G06F 3/0652* (2013.01); *G06F 3/0673* (2013.01); *G06F 21/6218* (2013.01)

(58) Field of Classification Search
CPC .. G06F 21/604; G06F 3/0623; G06F 21/6218; G06F 3/0673; G06F 3/0652
See application file for complete search history.

(56) References Cited

U.S. PATENT DOCUMENTS

| | | | | |
|---|---|---|---|---|
| 8,200,639 B2 * | 6/2012 | Dahiwadkar | .......... | G11B 5/024 707/692 |
| 9,208,341 B2 * | 12/2015 | Kang | .................. | G06F 21/6218 |
| 9,754,124 B1 * | 9/2017 | Takayama | ............... | G06F 21/80 |
| 2002/0171546 A1 * | 11/2002 | Evans | ..................... | G06F 21/88 340/540 |
| 2003/0191938 A1 * | 10/2003 | Woods | ................ | G06F 21/6209 713/165 |
| 2004/0243759 A1 * | 12/2004 | Itoh | ......................... | G06F 21/80 711/112 |
| 2006/0107317 A1 * | 5/2006 | Moran | ................ | G06F 21/6218 726/21 |
| 2007/0250920 A1 * | 10/2007 | Lindsay | ................ | G07F 7/1025 726/7 |
| 2008/0098172 A1 * | 4/2008 | Tsang | .................... | G06F 21/554 711/115 |
| 2010/0090831 A1 * | 4/2010 | Zhao | .................... | H04W 12/126 340/572.1 |
| 2011/0246766 A1 * | 10/2011 | Orsini | ................. | G06F 21/6218 713/160 |
| 2013/0247222 A1 * | 9/2013 | Maksim | ............. | G06F 21/6218 726/28 |
| 2015/0339497 A1 * | 11/2015 | Kurian | ................ | G06F 21/6218 726/34 |
| 2018/0189502 A1 * | 7/2018 | Kumar | ................ | G06F 21/6254 |

* cited by examiner

*Primary Examiner* — Shanto Abedin

(74) *Attorney, Agent, or Firm* — RC Trademark Company

(57) ABSTRACT

According to some embodiments, a system and method are provided to prevent data on a portable data device from being compromised. The method comprises receive a password associated with an emergency situation. In response to the received password, destroying original data files in one or more of the plurality of partitions based on the received password.

14 Claims, 7 Drawing Sheets

SECURE PORTABLE DATA APPARATUS

BACKGROUND

A portable data device, such as, but not limited to, a thumb drive, pen drive, gig stick, flash stick, jump drive, disk key, flash-drive, memory stick, universal serial bus ("USB") drive, is a data storage device that includes flash memory or in some cases, a physical hard drive, with an integrated USB interface that provides a user with a specific amount of storage capacity.

A portable data device is typically portable, removable, rewritable and, in some cases, much smaller than a conventional hard drive. Being portable, a user may often carry a portable data device on their person which, if storing personal, or confidential data, creates a risk that the personal or confidential data may be compromised if the user is robbed or held hostage. Furthermore, if a user that is held hostage attempts to destroys the portable data device, the user's safety may be put at risk.

It would therefore be desirable to provide a system to prevent personal, or confidential data, from being compromised while keeping a user safe from harm.

SUMMARY

Some embodiments described herein relate to a system and a method to prevent data on a portable data device from being compromised. The method comprises receive a password associated with an emergency situation. In response to the received password, original data files in one or more of a plurality of partitions on a portable data device are destroyed based on the received password. A technical advantage of some embodiments disclosed herein are improved systems and methods for preventing data on a portable data device from being compromised while preventing an owner of the portable data device from being harmed.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, components and circuits have not been described in detail so as not to obscure the embodiments.

The present embodiments relate to a system and method associated with preventing data on a portable data device from being compromised and, at the same time, keeping a user safe by covertly destroying the data on the portable data device. The present embodiments further relate to a security system for a portable data device for use in a situation when a user is being forced to reveal data on their portable data device and the user wants to comply with the demands (for safety concerns) but the user does not want to actually reveal the data.

Figure 1:
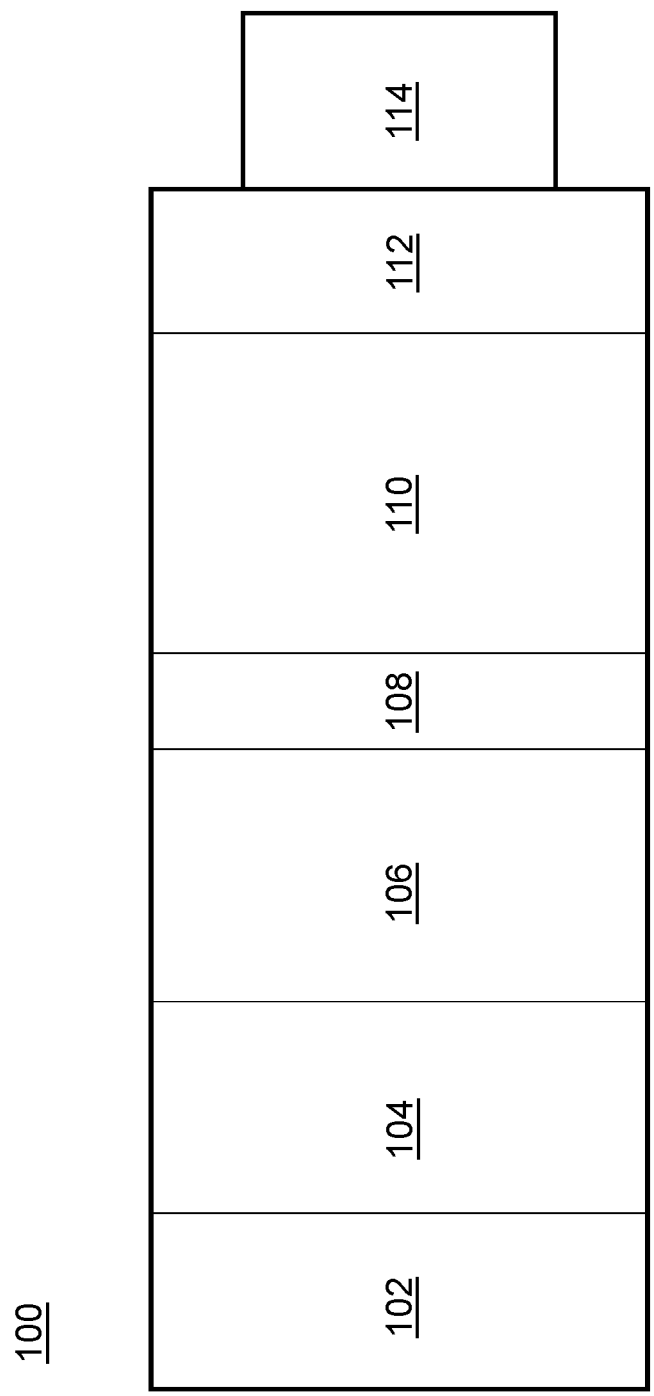
FIG. 1 illustrates a portable data device in accordance with some embodiments.

Now referring to FIG. 1, an embodiment of a portable data device 100 is illustrated. As illustrated in FIG. 1, the portable data device 100 may comprise a plug or interface 114 as well as a plurality of partitions 102/104/106/108/110/112. In some embodiments, the interface 114 may comprise a wireless interface. The wireless interface may communicate with an external electronic device to provide an interface between the portable data device 100 and the external electronic device. Furthermore, the wireless interface may send and receive data between the portable data device 100 and the external electronic device. In some embodiments, the portable data device 100 may comprise a wireless interface and a plug to provide multiple ways to interface the portable data device. The plug or interface 114 may comprise a USB interface, such as, but not limited to, a USB type A, USB type B, USB type C or other variant of computer interface. The portable data device 100 may be preconfigured to include the plurality of partitions 102/104/106/108/110/112. Each of the plurality of partitions 102/104/106/108/110/112 may be associated with a unique password or, in some embodiments, a single password may access multiple partitions. When a user enters a password to access the portable data device, the user may be given access to a single particular partition or a group of partitions (e.g., two or three partitions) that are associated with the password. A user may use different passwords to access a same partition or one or more partitions, and each password may be associated with different access privileges (read, write, full control). Each of the plurality of partitions 102/104/106/108/110/112 may store data. In some embodiments, particular partitions may be used for performance of a specific function. For example, one or more partitions may be used to store user data (e.g., 102/104/106/110). Other partitions, such as partition 108, may comprise a read-only partition that includes processor-executable steps to initiate a security measure. In such an embodiment, the security measure of partition 108 may only be executed when an emergency password is entered. Read-only partitions, such as partition 108, may be pre-configured with code to execute the security measure and a user may not have access to the code to execute the security measure. However, a partition, such as partition 112, may comprise a partition that works in conjunction with the security measure of partition 108. For example, partition 112 may store configuration files that may be configured/modified by a user to determine a type of security measure that will be implemented based on a particular emergency password that is entered. Furthermore, partition 112 may store pre-defined files that may be used to overwrite a user data partition (102/104/106/110) as will be explained in more detail below.

Figure 2:
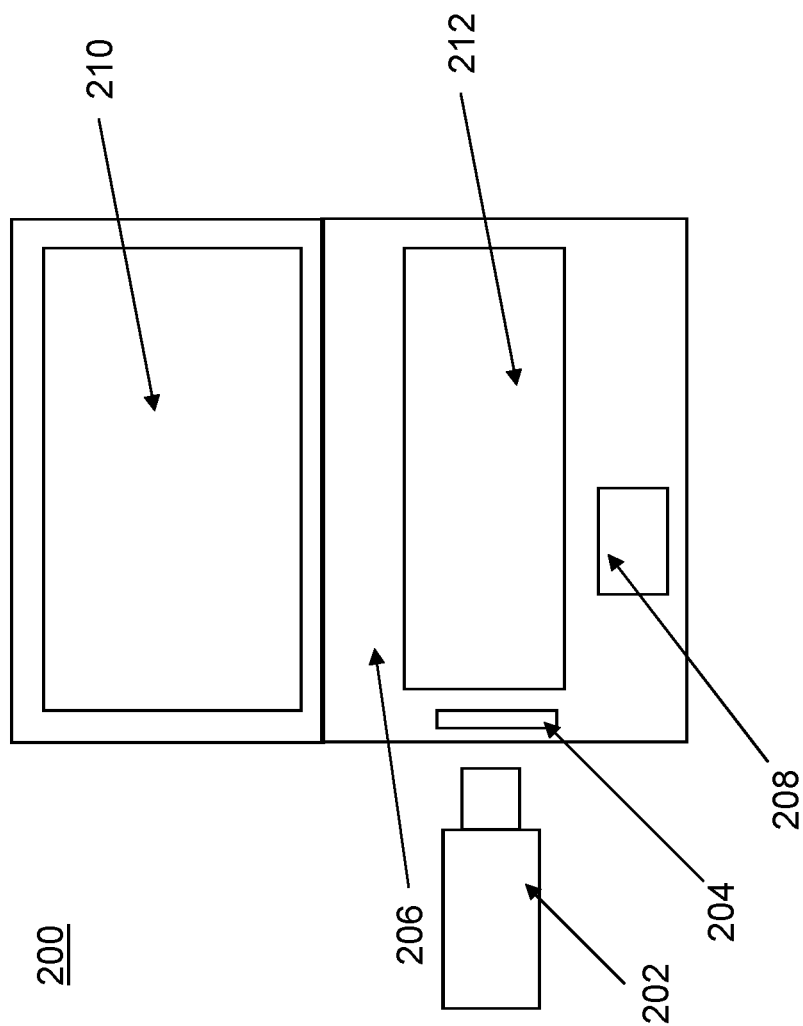
FIG. 2 illustrates a system according to some embodiments.

Referring now to FIG. 2, an embodiment of a system 200 is illustrated. The system 200 may comprise a computing device 206 that includes, at least, a port 204 for receiving a portable data device 202 and a processor 208. The computing device 206 may also comprise, or be coupled to, an output device 210 (e.g., to output and/or display data to a user) and an input device 212 (e.g., a mouse, microphone and/or keyboard). The output device 210 may comprise any display that can visualize and/or indicate instructions to a user. For example, the output device 210 may display a field for a user to enter a password or the output device 210 may aurally communicate with the user, in conjunction with the input device 212, to enter a spoken password. The computing device 206 may comprise, but is not limited to, a desktop computer, a laptop computer, a cell phone, or a tablet computer.

The processor 208 may comprise one or more commercially available Central Processing Units (CPUs) in the form of one-chip microprocessors, coupled to a communication device configured to communicate via a communication network (not shown in FIG. 2). The communication network may be used to communicate, for example, with one or more users and to communicate with the portable data device 202. The processor 208 also communicates with a memory/storage device such as the portable data device 202 that stores data. The portable data device 202 may store a program and/or processing logic for controlling the processor 208. The processor 208 performs instructions of the programs, and thereby operates in accordance with any of the embodiments described herein. For example, the processor 208 may execute instructions to covertly destroy data on one or more partitions of the portable data device 202.

The programs stored on the portable data device 202 may be stored in a compiled, compressed, uncompiled and/or encrypted format or a combination. The programs may furthermore include other program elements, such as an operating system, a database management system, and/or device drivers used by the processor 208.

In some embodiments, the portable data device 202 may comprise an onboard processor (not shown in FIG. 2) that may be included as part of the interface (e.g., interface 114 of FIG. 1) to execute the computer-readable instructions to destroy the data on one or more partitions of the portable data device 202 (e.g. a security procedure). In some embodiments, the onboard processor may be used as a backup to the processor 208. For example, in a case where the processor 208 does not timely begin destroying the data on the one or more partitions of the portable data device 202 (e.g., within 5 or 6 seconds), the onboard processor may execute the security procedure to destroy the data. An advantage of having the processor 208 execute the security procedure is that it makes it appear that there is nothing different about the portable data device 202. However, to ensure that the data on the portable data device 202 is protected, the onboard processor may be used to ensure that the security procedure is executed and that the data is destroyed.

Figure 3:
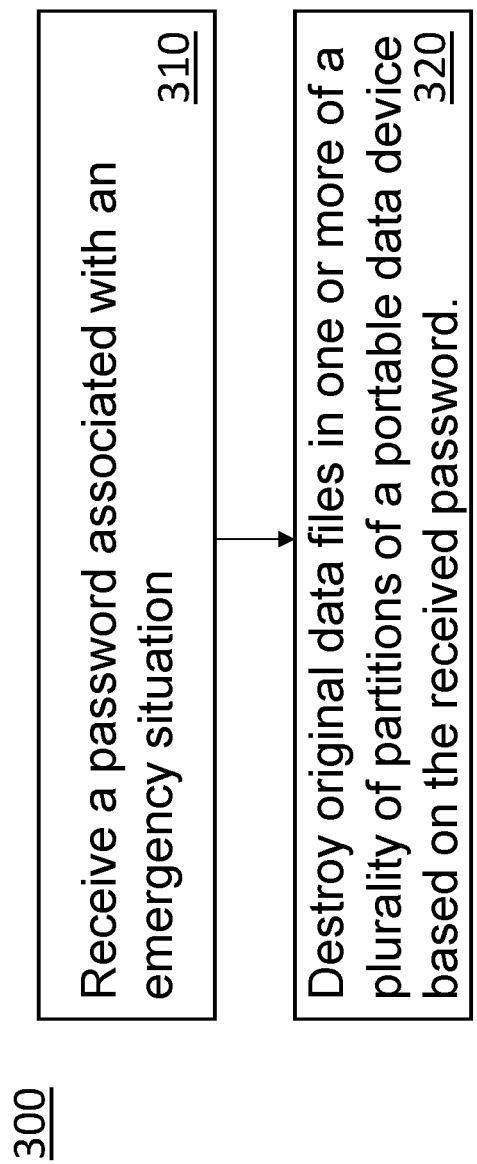
FIG. 3 illustrates a method in accordance with some embodiments.

Now referring to FIG. 3, a method 300 that might be performed by the system 200, described with respect to FIG. 2, is illustrated according to some embodiments. The flow chart described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 300 may relate to covertly destroying data on one or more partitions of a portable data device to keep data on the one or more partitions from being compromised while allowing a user to comply, or be perceived as complying, with demands to access the portable data device.

Now referring to 310, a password associated with an emergency situation is received. The password may be received a computing system, such as the computing system described with respect to FIG. 2, to access a portable data device. The emergency situation may relate to a situation where a user is being forced, against their will, to enter a password to access the portable data device. In this situation, instead of entering a regular password to access a partition where the data is located on the portable data device, the user may enter an emergency situation password that is only used in case the user is being forced to access the portable data device. The regular password to access data on the portable data device may functions in a conventional fashion to protect the data from unauthorized access. On the other hand, the emergency situation password may be used to initiate a program on the portable data device to destroy data in one or more of the plurality of partitions on the portable data device to keep the data from being compromised while allowing a user to comply, or at least pretend to comply, with demands to access the portable data device.

For purposes of illustrating features of the present embodiments, some simple examples will now be introduced and referenced throughout the disclosure. Those skilled in the art will recognize that these examples are illustrative and are not limiting and are provided purely for explanatory purposes.

Figure 4:
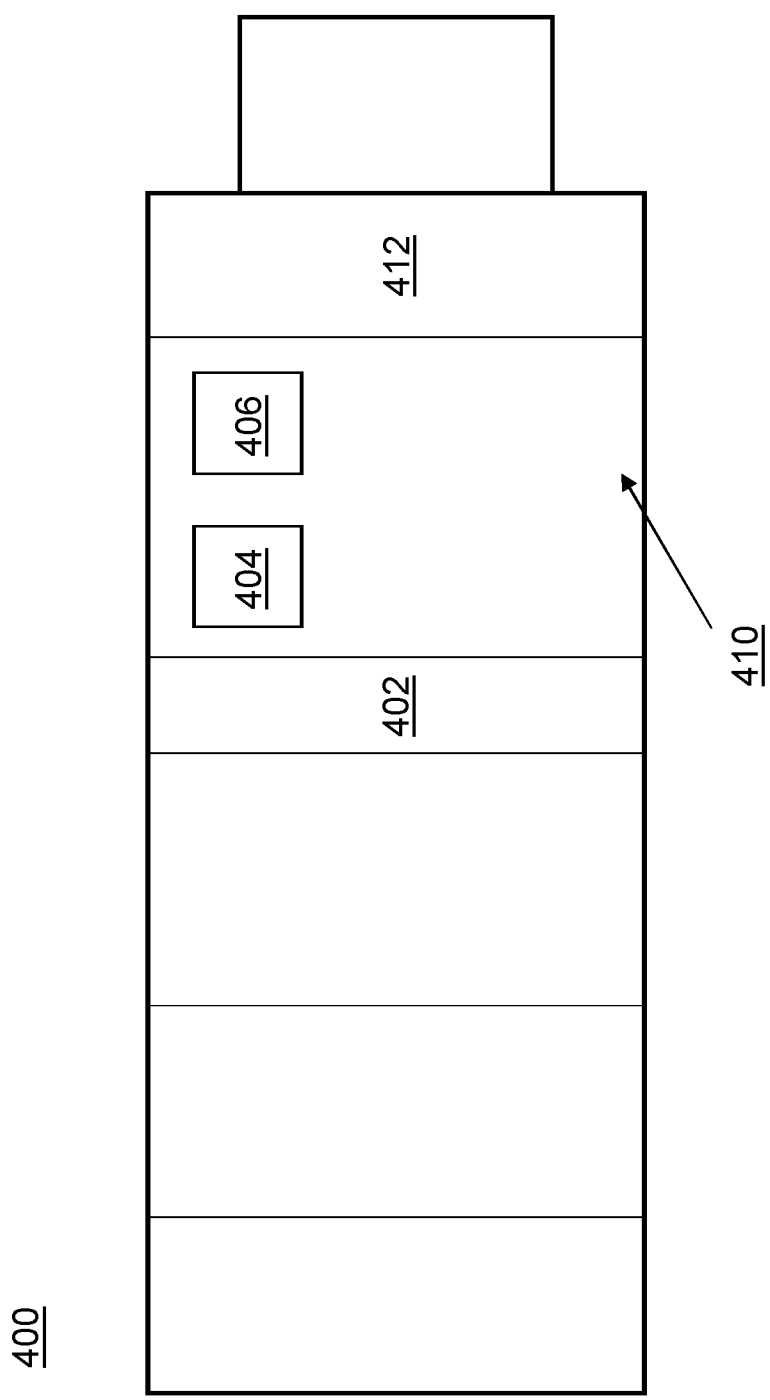
FIG. 4 illustrates a portable data device in accordance with some embodiments.

Referring now to FIG. 4, an embodiment of a portable data device 400 is illustrated. The portable data device 400 comprises a read-only partition 402 that comprises computer-executable steps to execute a security measure to prevent data stored on partition 410 from being compromised. The portable data device 400 further comprises a partition 412 that comprises data files associated with the security measure. The portable data device 400 may be inserted into a computer system and when a user enters a password, such as "passwordONE" the user may access the data stored on partition 410. In this example, partition 410 comprises two confidential files: first file 404 and second file 406.

In this example, the user is held hostage and is demanded, at gun point, to enter a password to access the data on the portable data device 400. To comply with the demand, the user enters an emergency password, such as "passwordTWO" which will engage the security measure on read-only partition 402. Once the emergency password is received at the portable data device 400 the security measure stored in partition 402 may be executed. In some embodiments, the security measure stored in partition 402 may be configured to destroy data on an entire partition, to destroy data on multiple partitions, or to destroy only specific files in one or more partitions. Such a configuration may be defined by a user and stored in a configuration file. A configuration that destroys only specific files over different partitions may provide additional security since confidential data may only be contained in specified files in a partition that comprises multiple files. Thus, the destruction of data in these partitions may be more difficult to be determined by an attacker since a majority of a partition may remain untouched.

Referring back to FIG. 3, at 320, original data files in one or more of a plurality of partitions of a portable data device are replaced or destroyed based on the received password. Files may be destroyed by (1) erasing data in one or more of the plurality of partitions and/or (2) creating fake data in the erased one or more of the plurality of partitions by overwriting the existing data. For example, the portable data device may simply erase the data in one or more partitions or the portable data device may overwrite the original data files with the fake data files instead of simply erasing the data in the one or more partitions or the portable data device.

In some embodiments, overwriting the data may comprise copying files containing fake data from another partition to replace the data on the portable storage device. In some embodiments, overwriting may comprise keeping the particular file names that currently exist on the portable storage device but changing the data within the file to random data so that a person forcing the user to reveal the data thinks he/she is getting the information that they want since the file names remain the same. However, in this case, the overwritten files may simply comprise junk data with a same file name. In some embodiments, every file on a partition where existing data is being destroyed may be replaced with a same file name but with a random amount of data so it appears that that files have various lengths.

Figure 5:
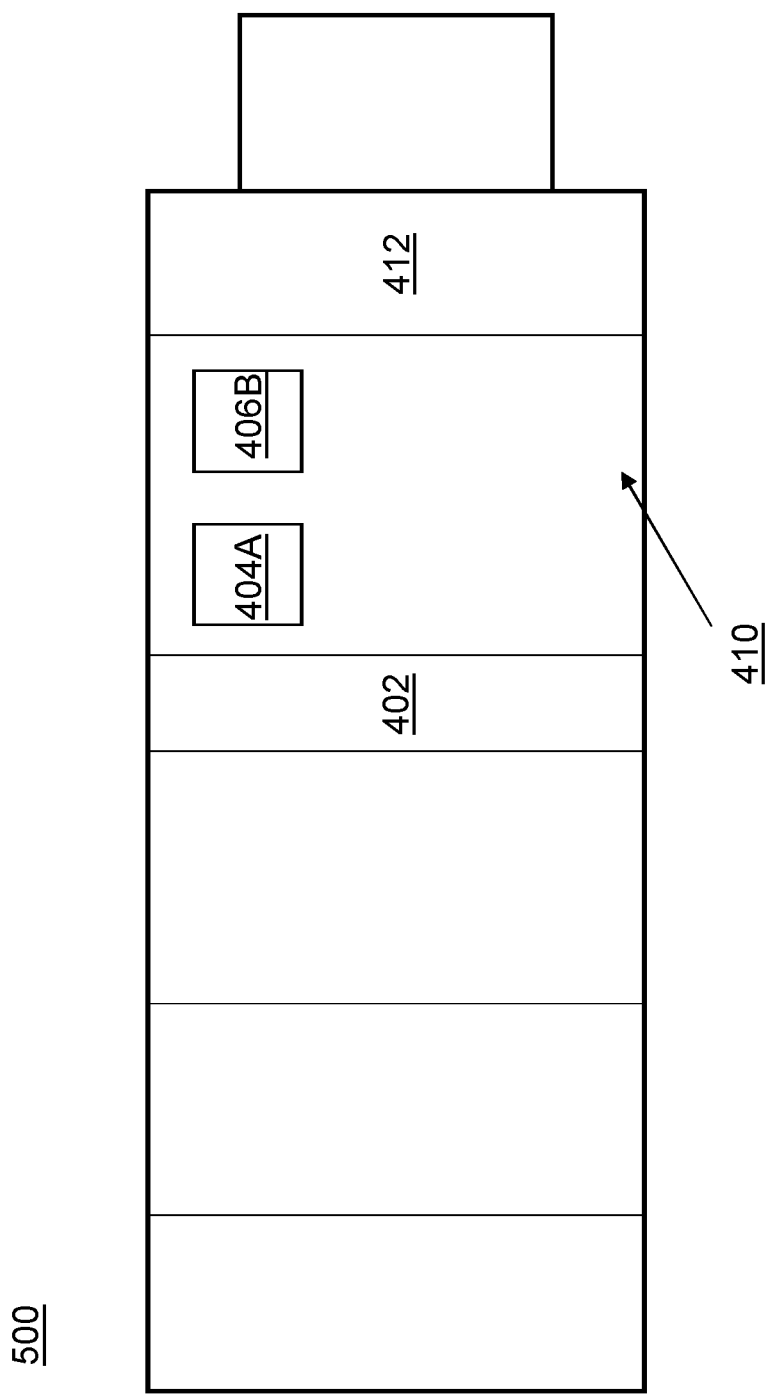
FIG. 5 illustrates a portable data device in accordance with some embodiments.

Continuing with the above example, and now referring to FIG. 5, an embodiment of a portable data device 500 where the original data files have been overwritten is illustrated. As illustrated in FIG. 5, after an emergency password has been received, the code associated with the security measure on read-only partition 402, may initiate an overwrite of the data files 404 and 406, as illustrated in FIG. 4. As illustrated in FIG. 5, data files 404 and 406 have been replaced by fake data files 404A and 404B where fake data file 404A has a same file name and file size as original data file 404. Likewise, fake data file 406A has a same file name and file size as original data file 406. In some embodiments, the fake data files may be generated with random sizes instead of matching the original file sizes. Generating random sizes instead of matching original file sizes may be faster than calculating actual file sizes. Thus, in this example, when a user is forced to reveal the data on the portable data device 402, the user is only displaying fake data files 404A and 404B since the original data files 404 and 406 have been overwritten.

Figure 6:
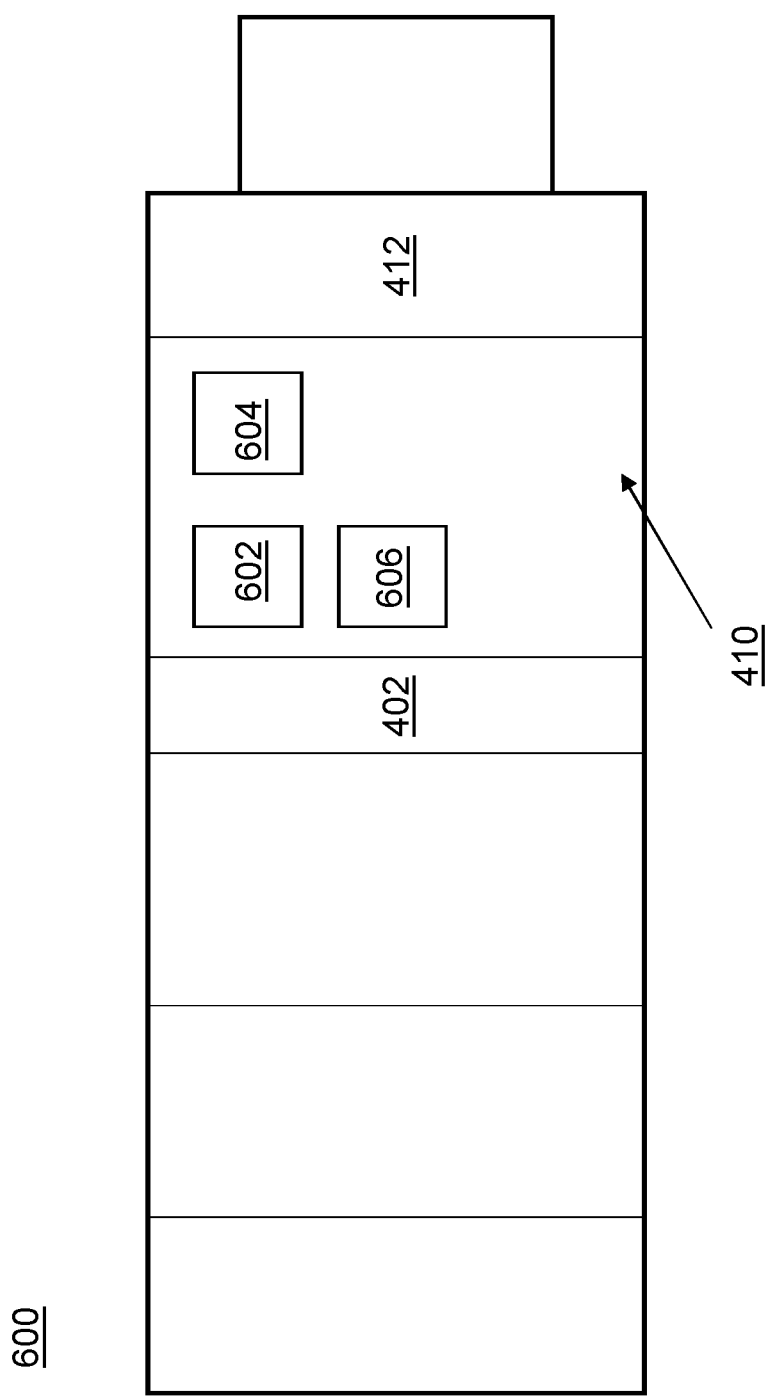
FIG. 6 illustrates a portable data device in accordance with some embodiments.

In another example, and now referring to FIG. 6, an embodiment of a portable data device 600 where the original data files 404 and 406 have been overwritten is illustrated. In some embodiments, instead of overwriting each individual file in a directory, the original data files 404 and 406 may simply be deleted and a predefined set of replacement data that is stored on the portable data device may be used to overwrite the existing data. For example, partition 412 may comprise, among other things, a predefined set of replacement data that may be used to overwrite all files on one or more partitions. For example, and as shown in FIG. 6, original data files 404 and 406 are simply deleted and overwritten by files 602, 604 and 606 which are stored in partition 412 as illustrated in FIG. 7.

Figure 7:
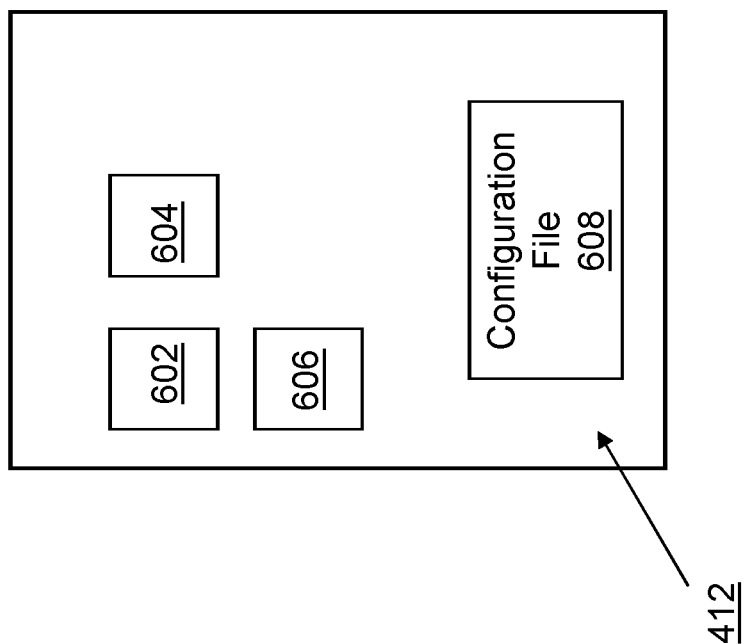
FIG. 7 illustrates a partition on a portable data device in accordance with some embodiments.

The present security may be configurable by a user and configuration data may be stored on a partition such as partition 412 in configuration file 608 as illustrated in FIG. 7. For example, a user might be able to reconfigure a size of a partition/drive layout (e.g., number of partitions, size of each partition, number of partitions associated with a password, etc.) anytime for flexibility. User configurations, and a type of security measure, may be stored in a configuration file that is located on partition 412 as illustrated in FIG. 7. Furthermore, the configuration file may have a setting such that when an emergency password is entered a user data partition where data is being destroyed (e.g., partition 410 in this example) may be unlocked during an erase and/or overwrite procedure so that it appears that the user is complying with the demands of the person forcing the user to reveal the data.

In some embodiments, the drive configuration may stay hidden forever to better protect the data on the portable storage device. For example, an attacker may not know an actual size of the portable storage device. In this embodiment, some partitions may not be counted in a size of the portable storage device. In some embodiments, only the partitions on the portable storage device that associated with a particular password are counted in a total size of the portable data device and any hidden partitions (e.g., partitions associated with a security measure) will not been revealed or counted in a size of the portable storage device.

As used herein, information may be "received" by or "transmitted" to, for example: (i) the monitoring platform 600 from another device; or (ii) a software application or module within the monitoring platform 600 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The process flow and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A portable data device, comprising:
   a non-transitory computer-readable medium comprising (i) a plurality of partitions and (ii) processor executable instructions, that when executed by a processor, performs a method, the method comprising:
   receiving a password associated with an emergency situation; and
   unlocking one or more of the plurality of partitions in response to receiving the password;
   destroying, via a processor, original data files in one or more of the plurality of partitions based on the received password, wherein destroying comprises replacing the original data files in the one or more of the plurality of portions with respective fake data files stored in the unlocked one or more plurality of partitions.

2. The portable data device of claim 1, wherein each of the respective fake data files comprise a same file name and same file size as a respective original data file.

3. The portable data device of claim 1, wherein each of the respective fake data files comprises a same file name as a respective original data file and a varying file size.

4. The portable data device of claim 1, wherein each of the respective fake data files are from a set of predefined replacement data stored on the portable data device.

5. The portable data device of claim 1, wherein file content associated with each respective fake data file is created by a random data generator.

6. The portable data device of claims 1, wherein one or more of the plurality of partitions are reconfigurable based on size.

7. The portable data device of claims 1, wherein one or more of the plurality of partitions are hidden and are not included in a total size of portable data device.

8. A portable data device, comprising:
   a non-transitory computer-readable medium comprising (i) a plurality of partitions and (ii) processor executable instructions, that when executed by a processor, performs a method, the method comprising:
   receiving a password associated with an emergency situation;
   unlocking one or more of the plurality of partitions in response to receiving the password; and
   destroying, via a processor, original data files in one or more of the plurality of partitions based on the received password, wherein destroying comprises replacing the original data files in the one or more of the plurality of portions with respective fake data files stored in the unlocked one or more plurality of partitions and wherein the newly unlocked one or more plurality of partitions are not included in a total size of portable data device.

9. The portable data device of claim 8, wherein each of the respective fake data files comprise a same file name and same file size as a respective original data file.

10. The portable data device of claims 8, wherein each of the respective fake data files comprises a same file name as a respective original data file and a varying file size.

11. The portable data device of claims 8, wherein each of the respective fake data files are from a set of predefined replacement data stored on the portable data device.

12. A portable data device, comprising:
    a non-transitory computer-readable medium comprising (i) a plurality of partitions and (ii) processor executable instructions, that when executed by a processor, performs a method, the method comprising: receiving a password associated with an emergency situation;
    unlocking one or more of the plurality of partitions in response to receiving the password; and
    destroying, via a processor, original data files in one or more of the plurality of partitions based on the received password, wherein destroying comprises replacing the original data flies in the one or more of the plurality of portions with respective fake data files stored in the newly unlocked one or more plurality of partitions, wherein the newly unlocked one or more plurality of partitions are not included in a total size of portable data device and each respective fake data file is created by a random data generator and is a randomly generated sized file.

13. The portable data device of claim 12, wherein each of the respective fake data files comprise a same file name as a respective original data file.

14. The portable data device of claims 12, wherein each of the respective fake data files comprises a same file name as a respective original data file and a varying file size.

* * * * *